(12) United States Patent
Bonner

(10) Patent No.: US 6,546,895 B2
(45) Date of Patent: Apr. 15, 2003

(54) ANIMAL SHELTER

(75) Inventor: R. Alan Bonner, Frenchtown, NJ (US)

(73) Assignee: Holton Industries, Frenchtown, NJ (US)

(*) Notice: Subject to any disclaimer, the term of this patent is extended or adjusted under 35 U.S.C. 154(b) by 0 days.

(21) Appl. No.: 09/873,992

(22) Filed: Jun. 4, 2001

(65) Prior Publication Data

US 2002/0179018 A1 Dec. 5, 2002

(51) Int. Cl.$^7$ .............................. A01K 1/02; A01K 1/03; A01K 31/00
(52) U.S. Cl. ......................................... 119/482; 119/416
(58) Field of Search ................................. 119/482, 452, 119/416, 417, 421, 428, 435, 702

(56) References Cited

U.S. PATENT DOCUMENTS

| | | | |
|---|---|---|---|
| D214,928 S | | 8/1969 | Swett et al. |
| 5,525,152 A | * | 6/1996 | Roschger et al. ............ 106/493 |
| 5,896,829 A | * | 4/1999 | Rothenberg et al. ......... 119/417 |
| 5,921,204 A | * | 7/1999 | Johnson ....................... 119/416 |
| D414,903 S | | 10/1999 | Baiera et al. |
| D420,471 S | * | 2/2000 | French ....................... D30/108 |
| 6,253,712 B1 | * | 7/2001 | Johnson ........................ 119/452 |

OTHER PUBLICATIONS

V. Bruce Grossie, Jr.; Charlie E. Castro; and David M. Ota, 1983, Laboratory Animal Science, v.33 (4), p. 365.*

Bio–Serv Product Showcase (Mouse Igloo).

* cited by examiner

*Primary Examiner*—Charles T. Jordan
*Assistant Examiner*—Judith A. Nelson

(57) ABSTRACT

An animal shelter including: an enclosure having at least one opening for ingress and egress of an animal, wherein the shelter is transparent, can be autoclaved, and inhibits light penetration is disclosed.

13 Claims, 1 Drawing Sheet

ANIMAL SHELTER

FIELD OF THE INVENTION

Figure 1:
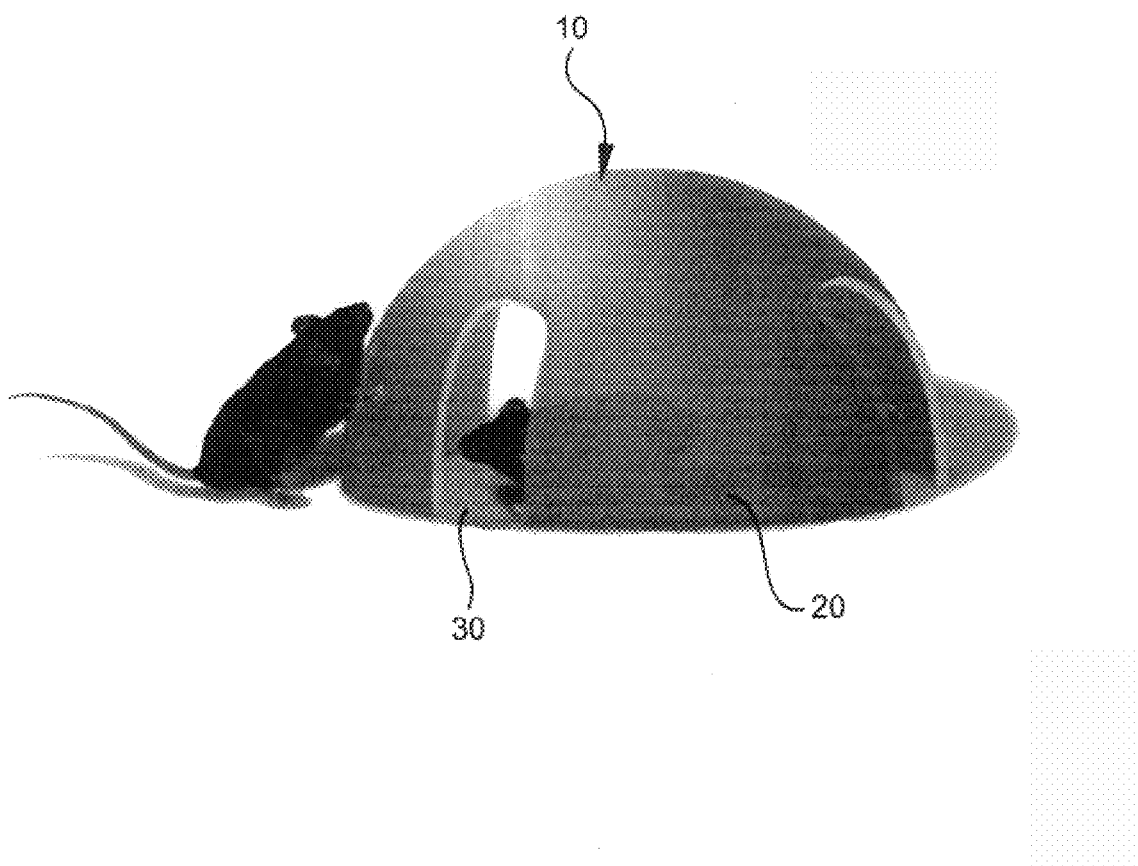

This invention relates to an animal shelter. The shelter is made of a material that can be autoclaved. The shelter is transparent which enables scientists to observe animals while the animals are within the shelter. A colorant is added to or coated on the material that the shelter is made from. The colorant inhibits light penetration so that the shelter has appropriate lighting conditions for the animals.

BACKGROUND OF THE INVENTION

Many people maintain small animals as pets or for scientific purposes. There are many commercially available homes for small animal pets. The homes are typically made of a transparent thermoplastic material, such as polypropylene. Some of the thermoplastics are tinted with a colorant such as yellow dye. The homes may be various shapes, and frequently have tubes that connect different areas of the homes.

Pet owners frequently keep their small animals in the homes described above. It is common to place a shelter, such as a box in the cage for the animals to sleep in. It is not important for the pet owners to be able to see into the shelter.

Many scientists observe small animals at various times, such as while the animals are sleeping or breeding. For this purpose, it would be useful to have a shelter that is transparent. Although a transparent shelter would enable observation of the animal, the transparency would also enable an excessive amount of light to penetrate into the shelter. This may be undesirable, as animals' habits are frequently affected by light.

People who maintain animals frequently clean the animals' shelters. For pet owners, cleaning usually entails wiping the shelter with a cleaning solution. Scientists may prefer to autoclave their animal shelters to reduce the likelihood of the animal getting sick or to prevent the spread of disease. Autoclaves utilize high temperature and pressure to kill microorganisms. It would be useful if an animal shelter was made of a material that could be autoclaved.

Therefore, there is a need for an animal shelter that is transparent, yet inhibits light penetration into the shelter, and can be autoclaved.

The Mouse Igloo is an animal shelter that is commercially available from Holton Industries trading as Bio-Serv Incorporated, Frenchtown, N.J. The shelter has several openings for animals to enter and exit the shelter. The shelter is made of polyethylene and has a colorant that makes the shelter opaque.

Despite the disclosure of the prior art, there is a continuing need for an animal shelter that is transparent, yet inhibits light penetration into the shelter, and can be autoclaved.

SUMMARY OF THE INVENTION

The present invention provides an animal shelter having an enclosure including at least one opening for ingress and egress of an animal, wherein the shelter is transparent, can be autoclaved, and inhibits light penetration.

DETAILED DESCRIPTION OF THE INVENTION

The animal shelter is made of a polymeric material that is transparent and can be autoclaved without melting. Suitable polymeric materials include polyolefins, such as, but not limited to, high molecular weight polyethylene, ultra high molecular weight polyethylene, and polypropylene; polyphenylsulphone; styrene; acrylates and methacrylates, such as, but not limited to, methyl acrylate, methyl methacrylate, ethyl acrylate, ethyl methacrylate, butyl acrylate, butyl methacrylate, and the like; polyamides, such as, but not limited to, nylon 6, nylon 6,6, nylon 12, nylon 101, and the like; polycarbonate; combinations thereof; and copolymers thereof. Polycarbonate is preferred. The polymeric material may be provided in solid form, such as a sheet or a powder, or in liquid form, depending on the desired process for manufacturing the shelter.

A colorant is added to the polymeric material, or coated onto the polymeric material the shelter is made from in order to inhibit light from getting into the shelter. Suitable colorants do not change the transparency of the polymeric material when combined with the polymeric material. Such colorants include, but are not limited to, red, burgundy, pink, orange, yellow, amber, green, blue, turquoise, violet, and purple. Red and amber are preferred. The colorants are commercially available as, for example, dyes, FD & C colors, lake dyes, natural colorants, and the like.

When the colorants are to be combined with the polymeric materials, the colorants should be soluble in the polymeric materials. The amount of colorant utilized will vary, but is sufficient to inhibit light penetration into the shelter, yet provide a transparent shelter. Generally, the amount of colorant ranges from about 0.0001 percent by weight to about 5 percent by weight, preferably from about 0.005 percent by weight to about 0.1 percent by weight based on the total weight of the material making up the shelter.

When the colorant is placed onto the shelter, the colorant generally is contained in a plastic film or is in liquid form. The amount of colorant utilized in the plastic film or liquid will vary, but is sufficient to inhibit light penetration into the shelter, yet provide a transparent shelter. Plastic films containing colorants may be placed onto the shelter by methods known in the art, such as the use of an adhesive to adhere the plastic film to the shelter, shrink wrapping the plastic film onto the shelter, or using heat to fuse the plastic film with the shelter. Liquid colorants may be applied by methods known in the art, such as spray coating, dip coating, and brush coating.

The shape of the shelter is not critical. Suitable shapes include squares, rectangles, triangles, pyramids, cones, half-spheres, half-cylinders, half-hexagons, tepees, and half-diamonds. Half-spheres are preferred. The size of the shelter is sufficient to house at least one small animal, preferably multiple small animals. In a round animal shelter, the diameter of the shelter typically ranges from about 5 cm to about 20 cm, preferably from about 7.5 cm to about 12.5 cm. The height of the animal shelter typically ranges from about 3.75 cm to about 12.5 cm, preferably from about 3.75 cm to about 10 cm.

The shelter contains at least one opening for ingress and egress of animals. Multiple openings may be useful, for example 2, 3, 4, 5, or 6 openings may be utilized. The shelter preferably contains 3 openings. The shape of the openings is not critical. Suitable shapes include, but are not limited to, circles, ellipses, half-ellipses, squares, rectangles, triangles, and stars. The size of the openings is sufficient to enable the ingress and egress of the small animals. The location of the openings can be in the form of a relief originating at the edge of the shelter or can be an opening located in the side of the shelter surrounded by the construction material. The openings must allow easy ingress and egress. Generally, the height of the opening may range from about 1.25 cm to about 6.25 cm, preferably from about 2.5 cm to about 5 cm. The width of the openings generally ranges from about 1.25 cm to about 6.25 cm, preferably from about 2.5 cm to about 5 cm.

The shelters may be made by processes known in the art. One suitable process is injection molding, where plastic material is melted and injected into a mold in the shape of the shelter, then cooled. Another suitable process is thermoforming plastic sheet, where a plastic sheet is melted and molded into the suitable shape, then the openings are cut or stamped. Vacuum forming is another useful process where plastic sheet is heated and drawn by vacuum into the suitable shape, then cooled. The openings are then cut or stamped into the shelter.

DRAWINGS

FIG. 1 is a perspective view of an animal shelter of the present invention. Animal shelter 10 includes an enclosure 20 having openings 30.

Several examples are set forth below to further illustrate the nature of the invention and the manner of carrying it out. However, the invention should not be considered as being limited to the details thereof.

EXAMPLE 1

LEXAN® brand polycarbonate is mixed with 0.01 percent by weight red dye based on the total weight of the mixture and melted. A mold in the shape of a half-sphere with 3 openings is injected with the melted mixture. The mixture is cooled and released from the mold. The animal shelter has the following dimensions: internal height—5 cm, diameter—10 cm, opening height—3.75 cm, opening width—3.1 cm.

EXAMPLE 2

UDEL R® polyphenylsulfone is mixed with 0.01 percent by weight amber dye based on the total weight of the mixture and melted. A mold in the shape of a half-cylinder with 1 opening is injected with the melted mixture. The mixture is cooled and released from the mold. The animal shelter has the following dimensions: internal height—5 cm, width—3.75 cm, length—15 cm, opening height—3.75 cm, openinng width—3.1 cm.

EXAMPLE 3

LEXAN 4504® polycarbonate is mixed with 0.01 percent by weight amber dye based on the total weight of the mixture and melted. A mold in the shape of a tepee with 3 openings is injected with the melted mixture. The mixture is cooled and released from the mold. The animal shelter has the following dimensions: internal height—10 cm, width at the base—8 cm, opening height—3.75 cm, opening width—3.1 cm.

What is claimed:

1. An animal shelter comprising:

an enclosure in a shape selected from the group consisting of a square, a rectangle, a triangle, a pyramid, a cone, a half-sphere, a half-cylinder, a half-hexagon, a tepee, and a half-diamond having at least one opening for ingress and egress of an animal, wherein the shelter can be autoclaved and contains from about 0.001 percent by weight to about 1 percent by weight of a colorant to inhibit light penetration, but provide a transparent shelter.

2. The animal shelter according to claim 1 wherein the shelter is made of a material selected from the group consisting of polyolefins, polyphenylsulphone, styrene, acrylates, methacrylates, polyamides, polycarbonate, combinations thereof, and copolymers thereof.

3. The animal shelter according to claim 2 wherein the shelter is made from polycarbonate.

4. The animal shelter according to claim 1 wherein the colorant is selected from the group consisting of dyes, lakes, and natural colorants.

5. The animal shelter according to claim 1 wherein the amount of colorant ranges from about 0.005 percent by weight to about 0.1 percent by weight based on the total weight of the material making up the shelter.

6. The animal shelter according to claim 1 wherein the shelter is in the shape of a half-sphere.

7. The animal shelter according to claim 1 wherein the shape of at least one opening is selected from the group consisting of circles, half circle, ellipses, half-ellipses, squares, rectangles, triangles, and stars.

8. The animal shelter according to claim 7 wherein the shape of at least one opening is a half-ellipse.

9. The animal shelter according to claim 7 wherein the location of the opening can be in the form of a relief originating at the edge of the shelter or can be an opening located in the side of the shelter surrounded by the construction material.

10. The animal shelter according to claim 8 wherein the number of openings is 3.

11. The animal shelter according to claim 10 wherein the height of the openings ranges from about 1.25 cm to about 6.25 cm and the width of the openings ranges from about 1.25 cm to about 6.25 cm.

12. The animal shelter according to claim 11 wherein the height of the openings ranges from about 2.5 cm to about 5 cm and the width of the openings ranges from about 2.5 cm to about 5 cm.

13. The animal shelter according to claim 6 wherein the shelter has a diameter from about 5 cm to about 20 cm and a height of from about 3.75 cm to about 12.5 cm.

* * * * *